United States Patent [19]

Sasaki et al.

[11] Patent Number: 5,172,040
[45] Date of Patent: Dec. 15, 1992

[54] NUMERICAL CONTROL APPARATUS

[75] Inventors: Takao Sasaki, Hachioji; Kentaro Fujibayashi, Musashino; Haruhiko Kozai, Minamitsuru, all of Japan

[73] Assignee: Fanuc Ltd, Japan

[21] Appl. No.: 646,716
[22] PCT Filed: May 23, 1990
[86] PCT No.: PCT/JP90/00670
  § 371 Date: Feb. 4, 1991
  § 102(e) Date: Feb. 4, 1991
[87] PCT Pub. No.: WO91/00556
  PCT Pub. Date: Jan. 10, 1991

[30] Foreign Application Priority Data

Jun. 29, 1989 [JP] Japan ................................. 1-167893

[51] Int. Cl.$^5$ .................... G05B 23/02; G05B 19/18
[52] U.S. Cl. ................... 318/571; 318/572; 318/561; 364/474.01
[58] Field of Search ................. 318/560-646; 364/474.01-474.3; 51/5 D, 35, 43, 165 TP, DIG. 14

[56] References Cited

U.S. PATENT DOCUMENTS

| | | | |
|---|---|---|---|
| 4,279,013 | 7/1981 | Cameron et al. | 318/561 X |
| 4,509,126 | 4/1985 | Olig et al. | 318/561 X |
| 4,535,408 | 8/1985 | Kishi et al. | 318/579 X |
| 4,723,219 | 2/1988 | Beyer et al. | 318/572 X |
| 4,733,343 | 3/1988 | Yoneda et al. | 318/565 X |
| 4,748,554 | 5/1988 | Gebauer et al. | 318/565 X |
| 4,815,000 | 3/1989 | Yoneda et al. | 318/571 X |
| 4,963,805 | 10/1990 | Suzuki et al. | 318/569 |
| 4,965,737 | 10/1990 | Iwagaya | 318/568.1 X |

Primary Examiner—Paul Ip
Attorney, Agent, or Firm—Staas & Halsey

[57] ABSTRACT

Disclosed is a numerical control apparatus for controlling a chopping operation of a tool used in a grinding machine and the like. A programmed instruction value calculation circuit (2) outputs an upper dead point instruction (Zu) and a lower dead point instruction (Zl), a correction value calculation circuit (3) calculates and outputs correction values (ΔZu, ΔZl), and a chopping instruction calculation circuit (4) outputs a chopping control output to a manual control circuit (6) based on these instructions and correction values to operate a servo motor. When an instruction value (Zi) is input from a manual pulse generator (5) to the chopping instruction calculation circuit (4), the chopping is effected while continuously changing the upper and lower dead points, thereby enabling an operator to easily adjust the upper and lower dead points.

3 Claims, 4 Drawing Sheets

NUMERICAL CONTROL APPARATUS

BACKGROUND OF THE INVENTION

1. Field of the Invention

The present invention relates to a numerical control apparatus for controlling a chopping operation of a tool used in a grinding machine and the like, and more specifically, to a numerical control apparatus by which a lower dead point and an upper dead point can be changed.

2. Description of the Related Art

FIG. 3 is a diagram showing an example of a chopping process, wherein a grinding tool 10 is moved upward and downward between a lower dead point Zl and an upper dead point Zu while being rotated about a Z-axis at a cycle of several times per second, and X- and Y-axes are moved accordingly to thereby cause grinding of side surfaces 11a, 11b, ... of a workpiece 11.

Heretofore, the lower and upper dead points were set by a limit switch or the like, but currently they are set by a program controlled by a numerical control apparatus and can be changed in accordance with the configuration of a workpiece while a chopping operation is effected or performed. The positions of the lower and the upper dead points, a feed speed of chopping, and the like, for example, are changed by instructions from the program. Note that, in some cases, a chopping width is changed instead of the position of the upper dead point.

FIG. 4 is a graph showing a chopping operation carried out in accordance with the instructions issued by the program as described above, wherein a vertical axis represents a Z-axis coordinate and a horizontal axis represents time.

First, at a time t11, the Z-axis is moved at a high speed to a coordinate value Zr of a reference point, and chopping is then started at predetermined intervals using a lower dead point Zl1 and an upper dead point Zu1 output by the program as target values. During the chopping, however, an instructed feed speed is multiplied by an accelerating or decelerating speed having a predetermined time constant and a servo circuit provides a delay. Therefore the Z-axis moves to a next upper dead point before reaching the instructed lower dead point Zl1 or upper dead point Zu1, and thus the actual distance moved is not sufficient.

Therefore, the numerical control apparatus measures a difference between the coordinate value output by the program and the actual position of the Z-axis, and corrects the distance. More specifically, after the chopping is started, instruction values, which are determined by adding a predetermined correction value to the values of the lower and upper dead points output by the program are output to the servo circuit. When the correction value is gradually increased, the insufficient measured distance is gradually reduced to L1, L2, L3 ..., and at the time, the insufficient measured distance is equal to or less than a predetermined value, whereupon the increase in the correction value is stopped, and thereafter the chopping is effected in response to the output values. This is called a servo correction.

Further, when the lower dead point and the upper dead point are to be changed thereafter to the positions Zl 2 and Zu2, respectively, the coordinate values thereof are input through the program, an MDI, or the like. When these coordinate values are input, the numerical control apparatus once cancels the previously effected servo correction, again measures an insufficient distance caused by the newly instructed coordinate values, and starts a servo correction in accordance with the insufficient measured distance.

Nevertheless, a problem arises in that, since each time coordinate values are changed a servo correction must be canceled and restarted, and a transient or delay period of the servo correction T1, T2, ... occurs each time the servo correction is canceled, some time is needed to stabilize the chopping width. Further, a fine adjustment of the lower and upper dead points must be effected by inputting coordinate values to the MDI, but this operation is time-consuming.

DISCLOSURE OF THE INVENTION

Taking the above into consideration, an object of the present invention is to provide a numerical control apparatus by which a lower dead point and an upper dead point can be easily changed in a short time.

To solve the above problem, in accordance with the present invention, there is provided a numerical control apparatus for controlling a chopping operation of a tool used in a grinding machine and the like, which includes instruction value output means capable of manually outputting predetermined instruction values, an instruction value calculation means for effecting a necessary correcting calculation of an instruction value of the lower dead point and an instruction value of the upper dead point of a chopping axis instructed by a program, respectively, and outputting the predetermined instruction values superimposed upon the corrected instruction values, respectively and axis control means for controlling the chopping axis based on the respective instruction values output from the instruction value calculation means.

When a servo delay correction has been completed, an interrupt of the instruction values is enabled and a pulse from a manual pulse generator is superimposed upon the present instruction values. Since the servo delay correction is not canceled at that time, the chopping axis instantly follows the changed instruction values, and thus a chopping operation is effected at a predetermined chopping width.

DESCRIPTION OF THE PREFERRED EMBODIMENT

An embodiment of the present invention will be described below with reference to the drawings.

Figure 1:
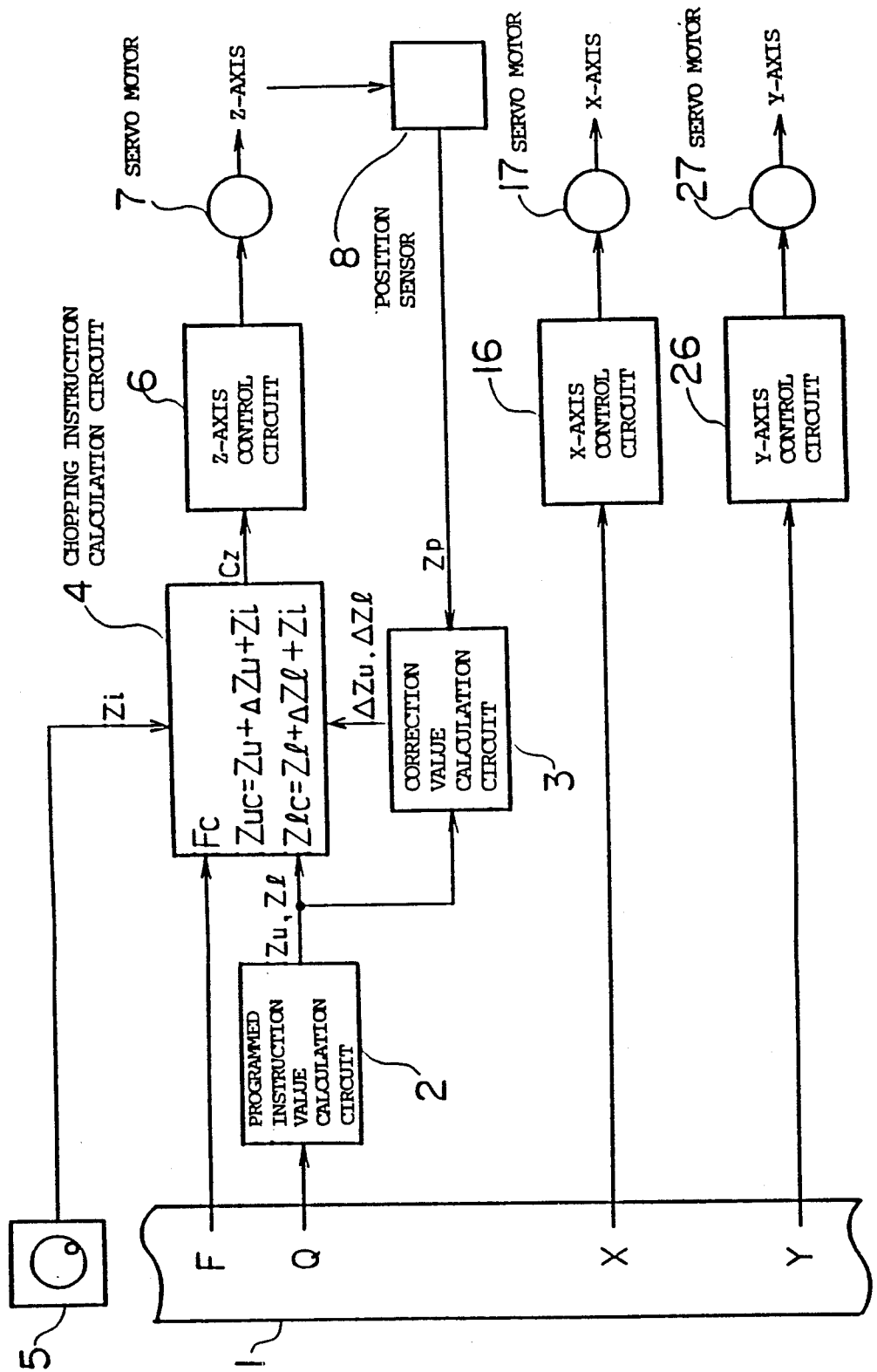
FIG. 1 is a block diagram showing the arrangement of an embodiment of a numerical control apparatus according to the present invention.

FIG. 1 is a block diagram showing the arrangement of an embodiment of a numerical control apparatus (CNC) according to the present invention, wherein an instruction (Q) of a chopping width is supplied from a program 1 to a programmed instruction value calculation circuit 2. The programmed instruction value calculation circuit 2 calculates a programmed instruction value Zl and a programmed instruction value Zu of a Z-axis serving as a chopping axis, based on the instruction Q and predetermined preset coordinate values.

A correction value calculation circuit 3 calculates a maximum value and a minimum value of the coordinate value Zp of the Z-axis detected by a position sensor 8 described below, compares these values with the programmed instruction values Zl and Zu, calculates the differences therebetween, and outputs correction values ΔZl and ΔZu proportional to those differences. Note that, when the correction values ΔZl and ΔZu are lowered and become equal to or less than set values, the thus reduced correction values are maintained.

A chopping instruction calculation circuit 4 adds the correction values ΔZl and ΔZu to the programmed instruction values Zl and Zu, to determine the correct instruction values Zlc and Zuc. Further, the chopping instruction calculation circuit 4 calculates a feed speed Fc by increasing by a predetermined amount a value of a feed speed instruction F output by the program 1, and thus the chopping number per unit time is not changed even if the correction values ΔZl and ΔZu are added. Then, the corrected instruction values Zlc and Zuc and the feed speed Fc are output as a movement instruction Cz.

Further, the chopping instruction calculation circuit 4 monitors the correction values ΔZl and ΔZu, regards or considers the timing at which both the values are lowered to become equal to or less than set values and the reduced values are maintained as the completion of the servo correction, and enables an interruption of the corrected instruction values Zlc and Zuc. Then, when a predetermined pulse is input through a manual pulse generator 5, an instruction value Zi corresponding to the number of the pulse is superimposed upon or added to the corrected instruction values Zlc and Zuc.

A Z-axis control circuit 6 drives a servo motor 7 based on a movement instruction Cz, to move the Z-axis, and the position sensor 8 detects the position of the Z-axis and supplies the coordinate value Zp thereof to the above correction value calculation circuit 3.

Further, an X instruction and a Y instruction are supplied from the program to an X-axis control circuit 16 and a Y-axis control circuit 26, respectively which control the X-axis and the Y-axis through servo motors 17 and 27.

Figure 2:
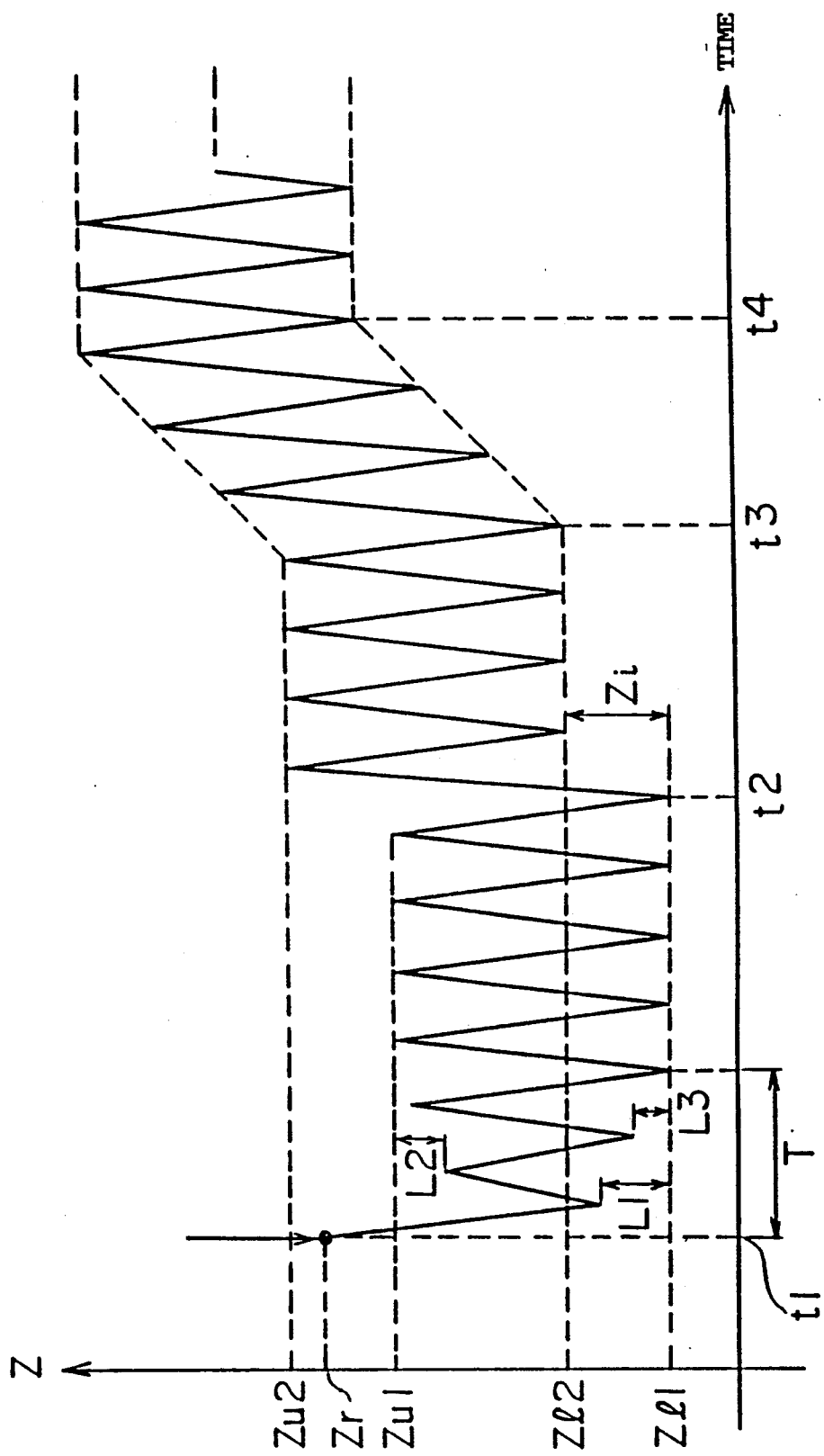
FIG. 2 is a graph showing a chopping operation effected by the embodiment of the numerical control apparatus according to the present invention.
Figure 3:
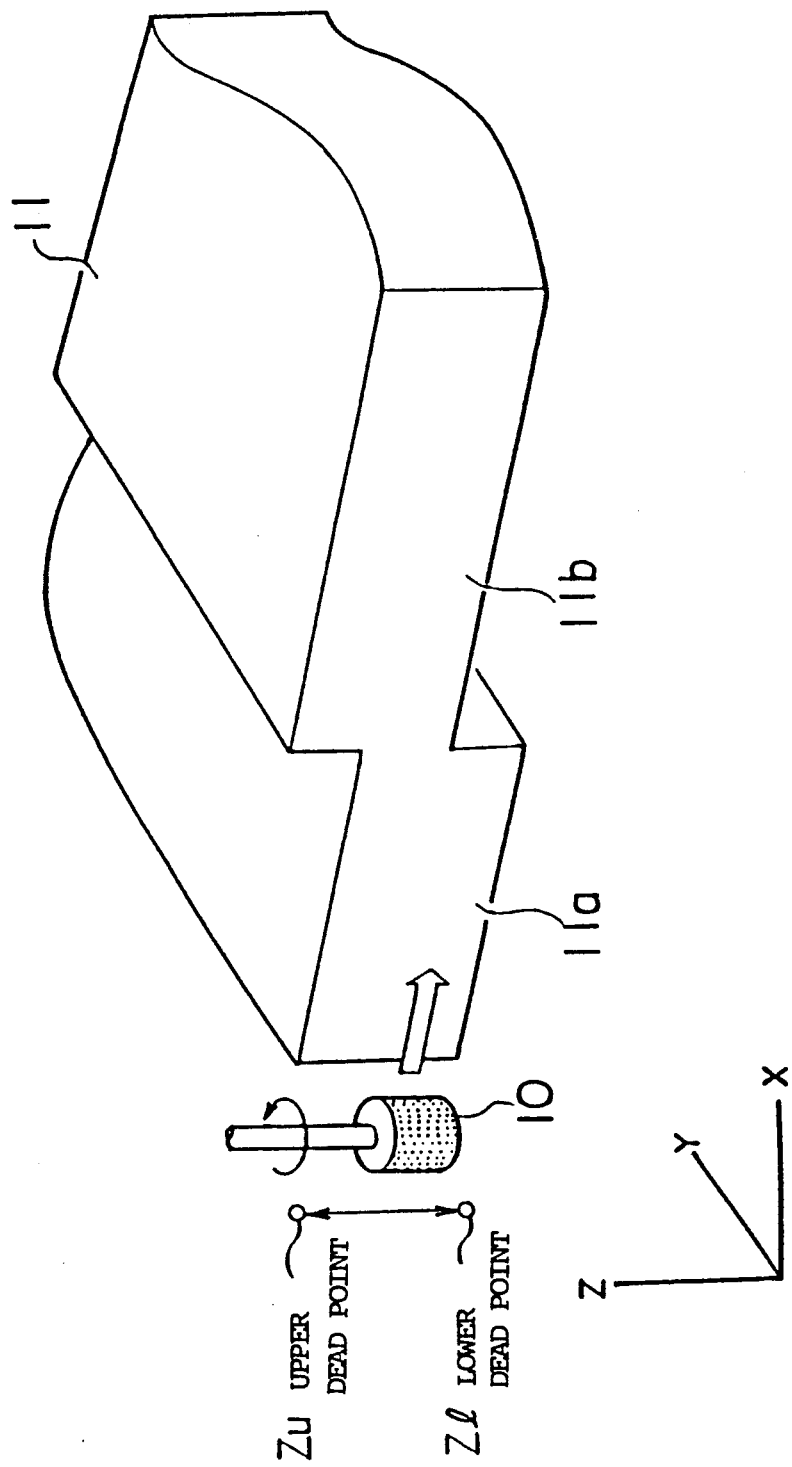
FIG. 3 is a diagram showing an example of a chopping processing.
Figure 4:
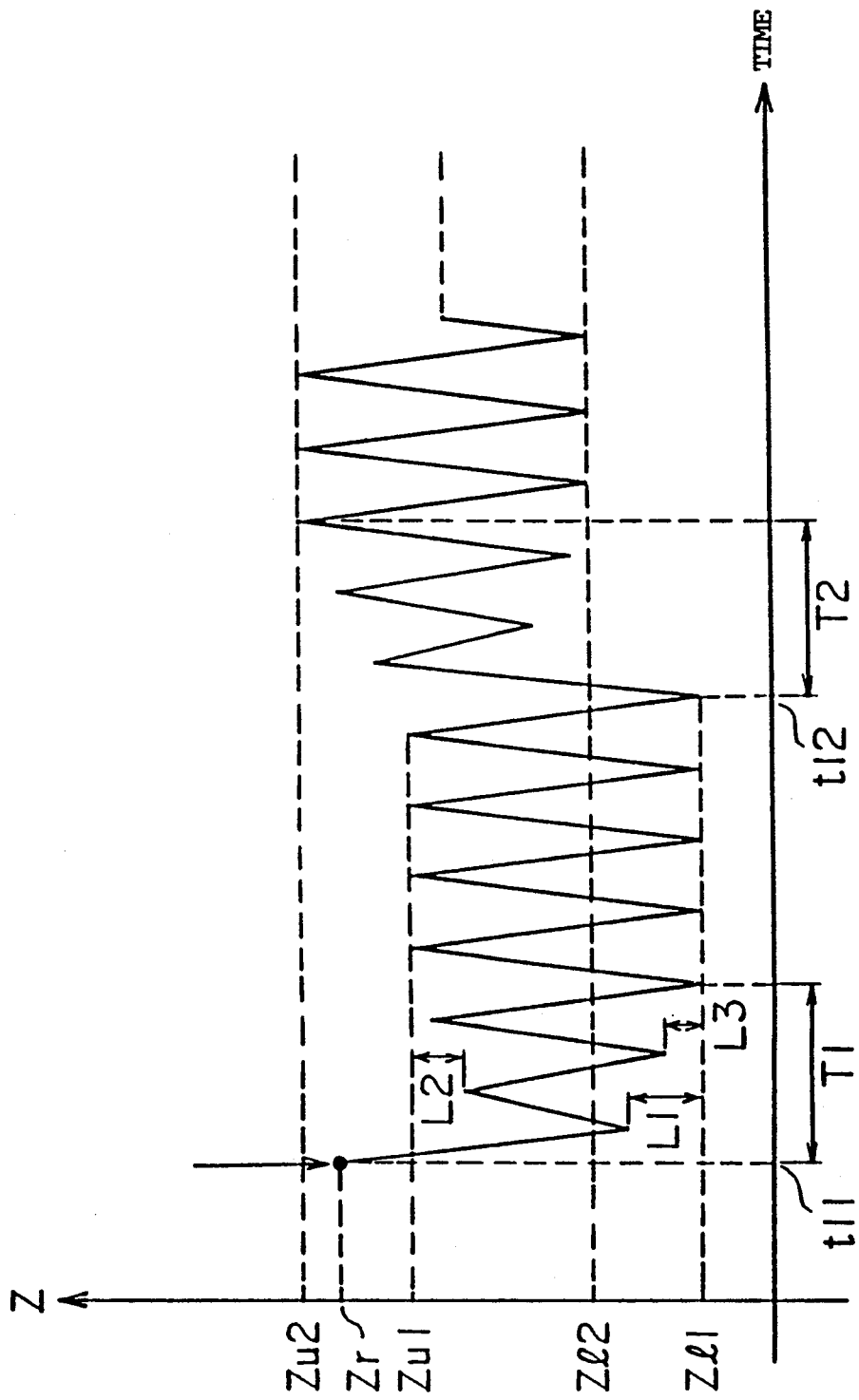
FIG. 4 is a graph showing a chopping operation effected by a prior art numerical control apparatus.

FIG. 2 is a graph showing a chopping operation effected by the above numerical control apparatus, wherein a vertical axis represents a Z-axis coordinate and a horizontal axis represents a time.

First, the Z-axis is moved at a high speed to the coordinate value Zr of a reference point at a time t1, and then chopping is started at predetermined intervals using programmed instruction values Zl1 and Zu1 as target values. Note, since the chopping feed speed is multiplied by an accelerating or decelerating speed having a predetermined time constant and a servo circuit provides a delay, an actual distance moved in a first cycle is short by a distance L1.

On the other hand, the numerical control apparatus measures the differences between the programmed instruction values Z1 and Zu1 and the actual coordinate values of the lower and upper dead points of the Z-axis and effects a servo correction, and thus the insufficient distance measured is gradually reduced to L2, L3, ..., and the actual lower and upper dead points substantially coincide with the programmed instruction values Zl1 and Zu1 after a predetermined time T has passed.

When a coordinate value Zi is input through the manual pulse generator at a time t2, the coordinate value Zi is superimposed upon the previous instruction values, and thus the instruction values of the lower and upper dead points are made Zl2 and Zu2. Since the servo correction is not canceled at this time, the actual lower and upper dead points of the Z-axis instantly coincide with the programmed instruction values Zl2 and Zu2, and thus the chopping is effected at the same predetermined chopping width as the previous width.

Further, a predetermined pulse is continuously input through the manual pulse generator, from a time t3 to a time t4, and superimposed upon the instruction values, and thus the chopping is effected with the predetermined chopping width while continuously changing the lower and upper dead points.

As described above, according to the present invention, since the lower and upper dead points are changed by superimposing a pulse from the manual pulse generator upon present instruction values, an operator can effect, for example, the fine adjustment of the lower and upper dead points in accordance with an actual machining state, whereby the operability is improved.

Further, since a servo delay correction is not canceled when the lower and upper dead points are changed, a chopping having a pinpoint accuracy can be effected at a predetermined and instructed chopping width at all times.

We claim:

1. A numerical control apparatus for controlling a chopping operation of a tool having a chopping axis including upper and lower dead points, and used in a grinding machine, comprising:
   instruction value output means for generating and outputting predetermined instruction values in response to an external command;
   instruction value calculation means for receiving said predetermined instruction values from said instruction value output means and performing a necessary correcting calculation generating a lower instruction value indicating the lower dead point and an upper instruction value indicating the upper dead point of the chopping axis output by a program, and generating corrected instruction values by adding said predetermined instruction values to the upper and lower instruction values; and
   axis control means for receiving said corrected instruction values output from said instruction value calculation means and controlling said chopping axis based on the corrected instruction values.

2. A numerical control apparatus according to claim 1, wherein said correcting calculation corrects an insufficient amount of movement of said chopping axis with respect to the upper and lower instruction values output by said program.

3. A numerical control apparatus according to claim 1, wherein said instruction value output means comprises a manual pulse generator.

* * * * *